United States Patent [19]
Morgunov

[11] Patent Number: 5,261,787
[45] Date of Patent: Nov. 16, 1993

[54] WATER TURBINES AND WATER FLOW TRANSITION MEMBERS THEREFOR

[75] Inventor: Genadiy M. Morgunov, Moscow, U.S.S.R.

[73] Assignee: Impsa International, Inc., Pittsburgh, Pa.

[21] Appl. No.: 822,067

[22] Filed: Jan. 17, 1992

[51] Int. Cl.⁵ .................................. F01D 1/02
[52] U.S. Cl. ........................ 415/208.1; 415/914
[58] Field of Search ............ 415/208.1, 1, 914, 182.1

[56] References Cited

U.S. PATENT DOCUMENTS

| | | | |
|---|---|---|---|
| 198,429 | 12/1877 | Stewart | 415/208.1 |
| 1,055,588 | 3/1913 | Wood | 415/208.1 |
| 1,583,415 | 5/1926 | Moody | 415/1 |
| 1,748,768 | 2/1930 | Hofmann | 415/208.1 |
| 1,803,220 | 4/1931 | Thompson | 415/208.1 |
| 1,987,082 | 1/1935 | Sharp | 415/208.1 |
| 2,662,726 | 12/1953 | Thomas | 415/1 |
| 3,386,155 | 6/1968 | Jenkinson | 415/1 |
| 4,431,370 | 2/1984 | Ichikawa et al. | 415/1 |

FOREIGN PATENT DOCUMENTS 138928  10/1979  Japan ........................... 415/914

*Primary Examiner*—John T. Kwon
*Attorney, Agent, or Firm*—Walter J. Blenko, Jr.; George K. Stacey

[57] ABSTRACT

A water turbine is shown having a water transition member in the form of a partial cone which is positioned on the downstream side of the turbine runner. The cone is mounted independently of rotation of the turbine member and may be rotated by a motor. The partial cone may have ridges or blades which may be retractable.

10 Claims, 6 Drawing Sheets

WATER TURBINES AND WATER FLOW TRANSITION MEMBERS THEREFOR

This invention relates to water driven turbines for hydroelectric generating plants and the like. More particularly, this invention relates to water flow transition apparatus which reduces water surging in the draft tube and vibration of the turbine.

In the design of water turbines, it is customary to provide a draft tube to conduct water from the turbine to the tail race. A transition member is commonly provided to channel flow of water from the turbine blades to the draft tube and to minimize surging and turbulence in the water flow. Such a transition member is usually in the form of a tapered hub mounted on the turbine runner or on the shaft supporting the turbine runner. The configuration of the transition member, runner, and draft tube is established in an effort to obtain a steady flow of water at an optimum loading of the turbine. In practice, however, water turbines must often be operated over a wide range of loads. It is observed that surging of water can take place in the draft tube leading to vibration in the turbine especially when the turbine is operated over a range of loads. While the turbine and draft tube may be designed for smooth operation at a design capacity, a change in load requires more or less water flow than the flow at design capacity and may lead to undesirable surging and vibration. Such an unstable condition is commonly associated with the formation of a "vortex rope" which extends into the draft tube from the turbine runner. In a Francis turbine operating under ideal conditions, water leaves the runner blades without any significant rotating velocity and will move down the draft tube without significant swirling motion. If the turbine is operated at less than the optimum load, a swirling flow will occur in the draft tube with the rope rotating in the same direction as the runner. If the load is higher than optimum, a rope is produced which rotates in the opposite direction from the runner. Those conditions lend to water surges in the draft tube and vibration in the turbine.

Various measures have been proposed or tried in an effort to overcome such surges. It is possible, for example, to avoid operating a hydraulic turbine in the load range where surges occur. Such a step produces significant operating problems. Likewise, redesign of the turbine blades or modification of the water velocity has undesirable side effects.

It has been proposed to insert various fixtures into the draft tube intended to reduce swirl in the draft tube and surging. Those solutions impose problems in the form of structural complexity, expense, and lack of adaptability to varying conditions.

Air injection into the draft tube has also been considered. Such solutions add to the expense of the installation and are essentially empirical so that they must be adjusted at the site for particular conditions involved.

I have invented new and useful improvements in water turbine design which overcome problems resulting from surging in the draft tube and vortex ropes. I provide a water flow transition member positioned to channel water flow on the downstream side of the blades and mounted independently of rotation of the runner. I prefer to mount the transition member independently of the runner but adjacent thereto. Preferably, I provide a shaft on which the transition member is mounted and which extends coaxially with the turbine shaft and generator shaft to the opposite end of the generator shaft.

I may position an electric motor between the transition member and the supporting shaft, and operate the electric motor selectively to rotate the transition member in a desired direction and at a desired speed. A hydraulic motor may be used in place of an electric motor. The transition member may be held fixed against rotation, or it may be rotated at selected speeds in the same direction as the runner, or in the opposite direction from the runner and at selected speeds. Alternatively, a motor may be placed at the end of the transition member supporting shaft which is remote from the transition member and may be operated to drive the transition member and supporting member as desired. As a further alternative, I may mount the motor directly to the runner and drive the transition member at a selected speed and in a direction relative to the runner.

Preferably, the transition member is in the form of a cone or tapered hub which is mounted adjacent to the runner on the downstream side of the runner blades. The transition member may be frusto-conical in shape. I prefer to roughen the surface of the transition member by forming grooves or ridges on the surface which extend radially from the tip of the cone to the base of the cone. Alternatively, I may provide fins on the surface of the cone extending radially from the tip of the cone to the base of the cone. In another embodiment of the invention, I mount the fins on a carrier which is movable relative to the cone so that the fins may be selectively extended from the surface of the cone or retracted within the cone.

Other details, objects, and advantages of my invention will become more apparent as the following description of certain present preferred embodiments proceed.

While the invention is illustrated and described as it is applied to a vertical Francis type turbine, it is to be understood that the invention may also be used with other types of hydraulic turbines such as Kaplan and propeller-type turbines with a vertical or a horizontal shaft.

In the accompanying drawings, I have illustrated a present preferred embodiment of my invention and several alternates in which FIG. 1 is a side elevational view taken partly in section of a Francis type turbine of conventional design;

Figure 1:
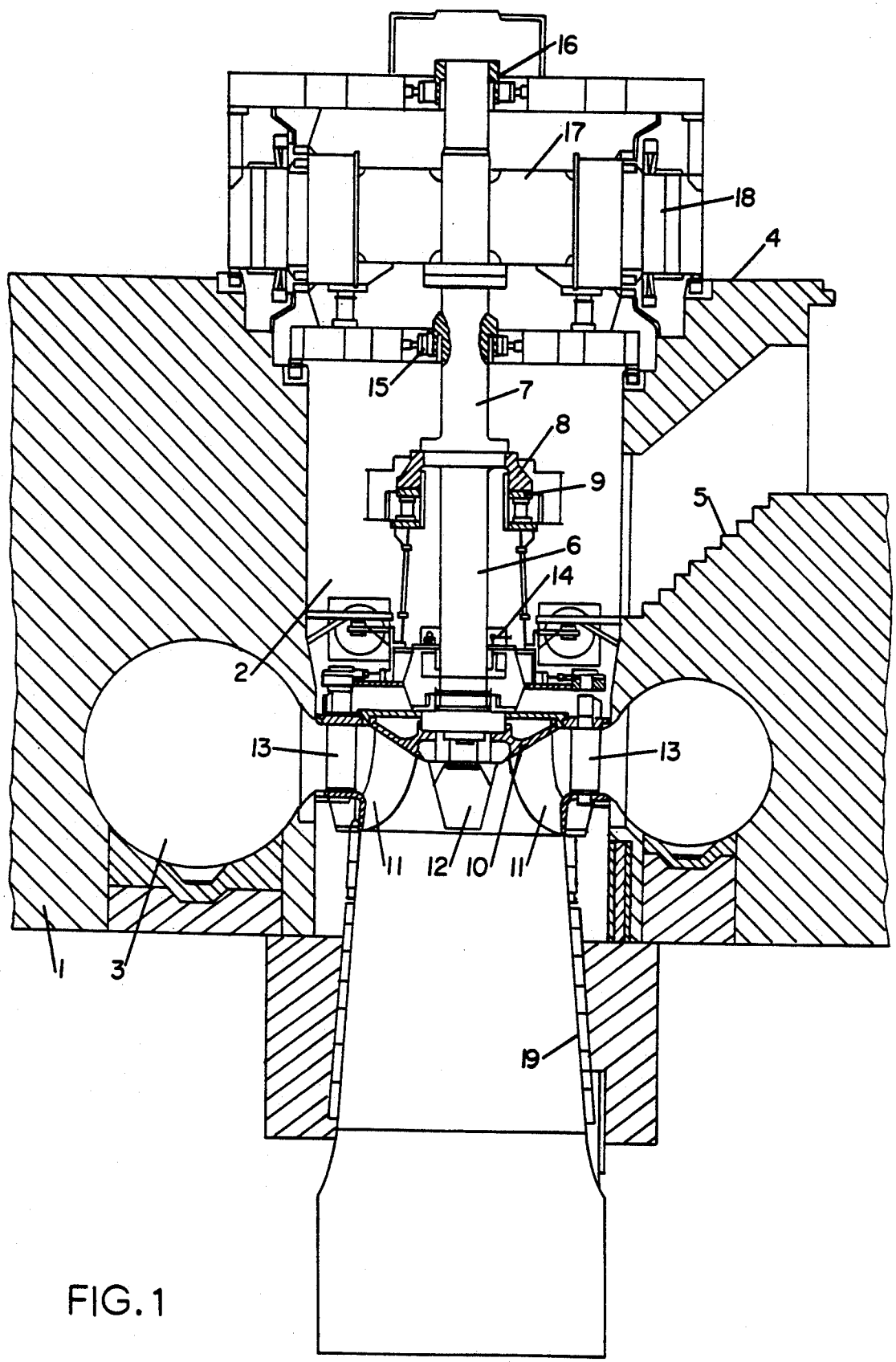

FIG. 1 shows in side sectional elevation a Francis type turbine of conventional design with an associated generator driven by the turbine. The power house comprises a concrete structure 1. The power house includes a turbine pit 2, a volute or scroll chamber 3, and a generator floor 4. Access to the turbine pit is by a flight of steps 5. A vertical turbine shaft 6 is coupled to a vertical generator shaft 7. A collar 8 is connected to the turbine shaft and generator shaft where they join and carries the vertical load of the entire turbo-generator assembly on a thrust bearing 9. A turbine runner 10 is connected to the bottom of turbine shaft 6 and includes a series of blades 11. A transition member 12 is fastened to the bottom of the turbine runner and is in the form of a truncated cone or tapered hub. A series of guide vanes 13 are positioned around the turbine runner, and are rotatable upon vertical axes to control water flow from the volute 3 to runner blades 11. A guide bearing 14 on the lower end of turbine shaft 6 maintains the turbine shaft in vertical alignment.

Generator shaft 7 is provided with a lower guide bearing 15 and an upper guide bearing 16 to maintain the generator shaft in proper alignment. The generator includes a rotor 17 and a stator 18.

An outwardly diverging draft tube conducts water from the turbine to a tail race.

In operation, water is supplied to volute 3 through a penstock from a supply source at a higher elevation. Flow of water to the runner is controlled by the position of guide vanes 13. Water which is admitted by guide vanes 13 passes through blades 11 on runner 10. The water then leaves the power house through draft tube 19 passing a tail race below the power house. The reaction forces generated by water impinging on blades 11 cause the blades and runner to rotate thereby imparting a rotary motion to the turbine shaft, the generator shaft, and the generator rotor. Movement of the rotor past the stator causes an electric current to be generated and transmitted to electric power lines.

To maintain required voltage and frequency, the turbine runner and the generator must rotate at constant speed under varying load conditions. Water flow is controlled by adjustment of the guide vanes 13 to maintain constant speed operation. Transition member 12 is intended to channel water leaving the runner blades 11 downwardly into the draft tube and to avoid unnecessary turbulence and cavitation beneath the turbine runner.

The hydraulic design of the turbine involves an optimum load and water flow. Under those conditions, stable operation can be expected. In the operation of an electric power system, however, wide ranges in loads can be expected over a twenty-four hour period. To meet those changes in loads, it becomes necessary to increase or decrease the power output of the turbines in the power house by increasing or decreasing water flow through the turbine runners. It has been found that as the load and water flow depart from the optimum design conditions, a vortex "rope" is developed trailing downwardly from the transition member into the draft tube. The generation of the vortex rope is associated with swirling of water in the draft tube as it leaves the turbine blades. Under lighter than optimum loads, the vortex swirl is in the same direction of rotation as the turbine blades. Under heavier than optimum loads, the vortex swirl is in the direction opposite to the direction of rotation of the turbine blades.

Figure 2:
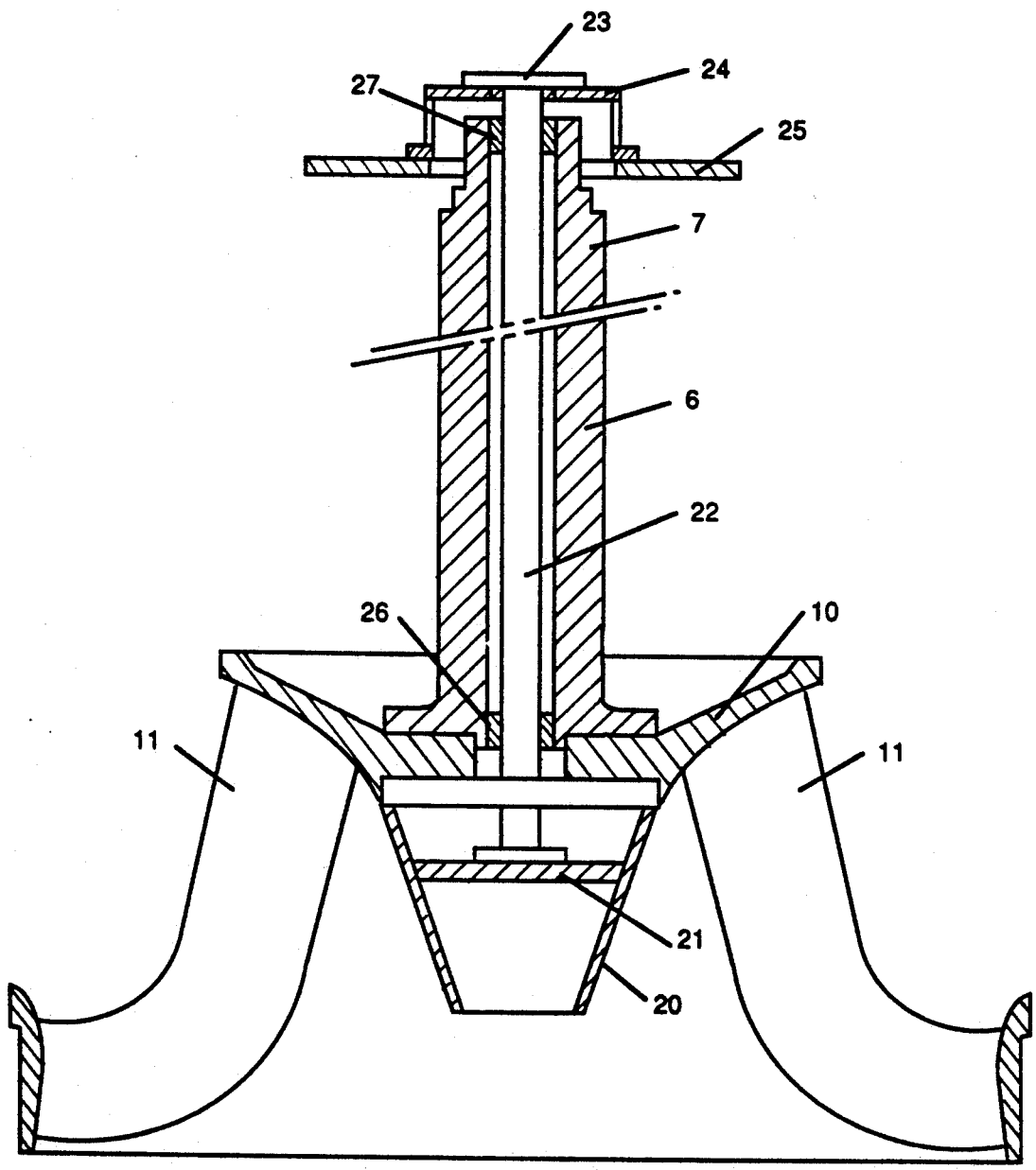
FIG. 2 is a side sectional view in simplified form of a turbine runner and independently mounted transition member.

In order to minimize and prevent swirling and generation of a vortex rope, a transition member 20 is provided as shown in FIG. 2. In FIGS. 2–7, parts like those in FIG. 1 are identified by the same reference numbers. Like a conventional transition member 12 (FIG. 1), transition member 20 is frustoconical in shape. Instead of being mounted to the turbine runner, however, it is welded to a support 21 which is mounted to and carried by a shaft 22. Shaft 22 extends coaxially through bores in turbine shaft 6 and generator shaft 7 and terminates in a collar 23 fixed to a bracket 24 on the generator end cover 25. Bushings 26 and 27 maintain shaft 22 aligned with turbine shaft 7 and generator shaft 8. Additional bushings may be used as necessary. Because cone 20 is carried by shaft 22 which is fixed to the generator end cover, cone 20 remains in stationary position while runner 10 is rotating during operation.

Figure 3:
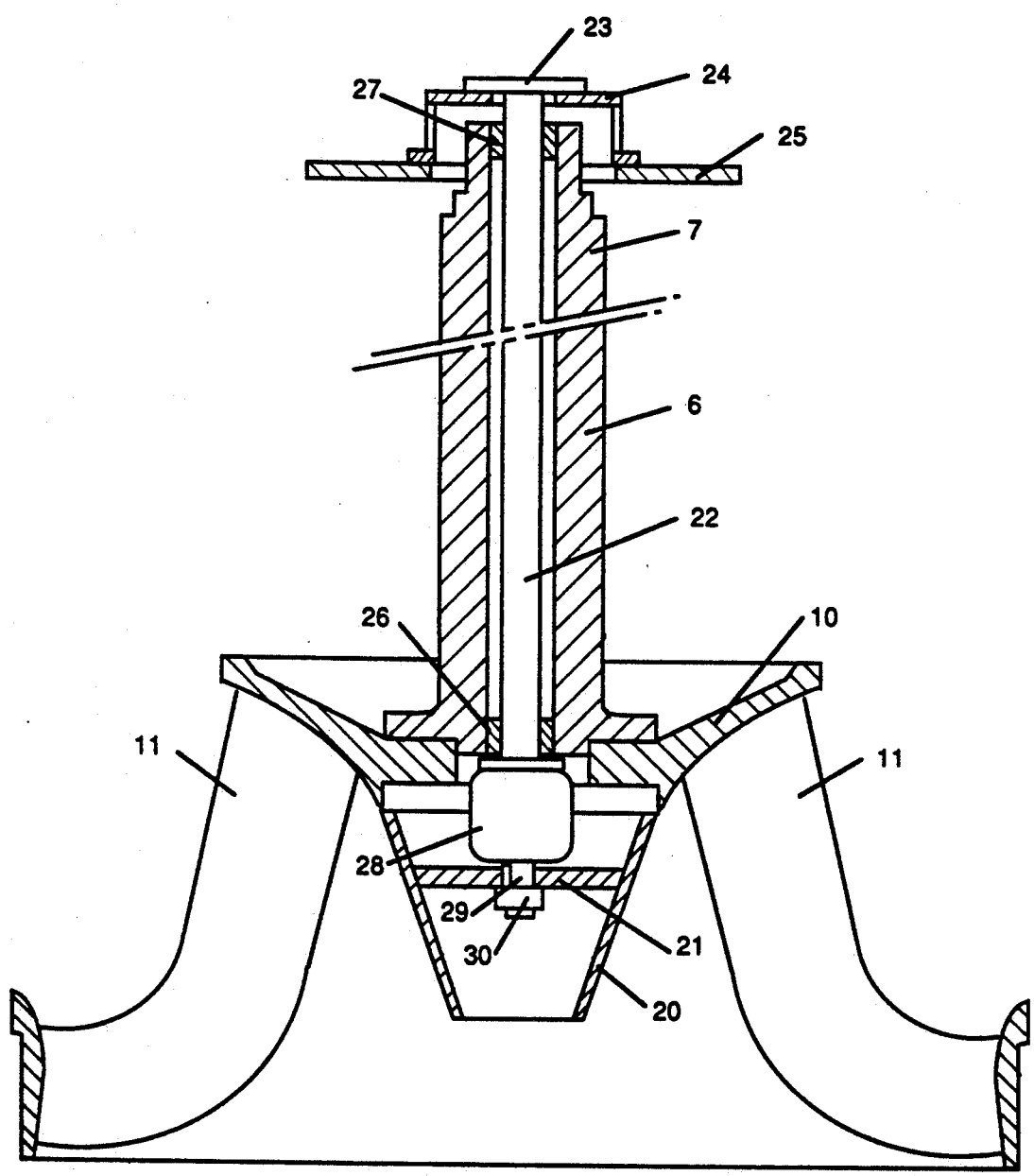
FIG. 3 is a side sectional view in simplified form of a turbine runner and independently mounted transition member with a drive motor mounted at the transition member end of the supporting shaft.

FIG. 3 shows an arrangement similar to that shown in FIG. 2, again with like numbers being used to identify like parts. In FIG. 3, support 21 and cone 20 are not attached directly to shaft 22. Instead, a motor 28 is attached to shaft 22 and has a rotatable output shaft 29. A collar 30 is provided to fasten support 21 to shaft 29. Motor 28 is reversible and can be driven to rotate cone 20 in either direction. Shaft 22 remains fixed in non-rotative position by connection to bracket 24 mounted on the generator end cover 25.

Figure 4:
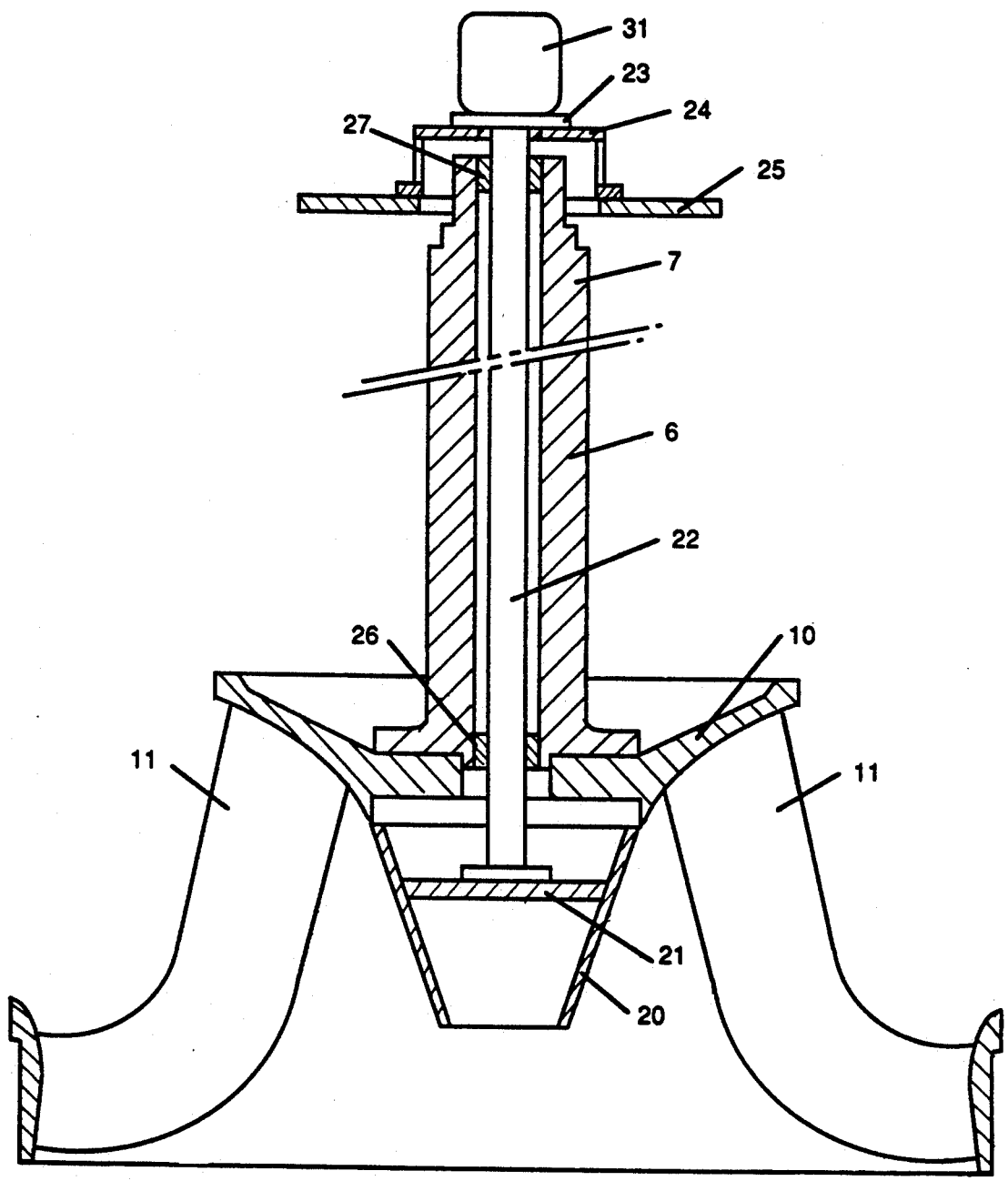
FIG. 4 is a side sectional view in simplified form of a turbine runner and independently mounted transition member with a drive motor mounted at the opposite end of the supporting shaft from the transition member.

FIG. 4 shows an arrangement similar to the arrangement of FIG. 3 except cone 20 and that support 21 are directly fastened to shaft 22. The opposite end of shaft 22 is connected, however, to the output of a motor 31 which is mounted directly on bracket 24 which in turn is fixed to generator end cover 25. Motor 31 may be operated to rotate shaft 22, support 21, and cone 20 in either direction.

Figure 5:
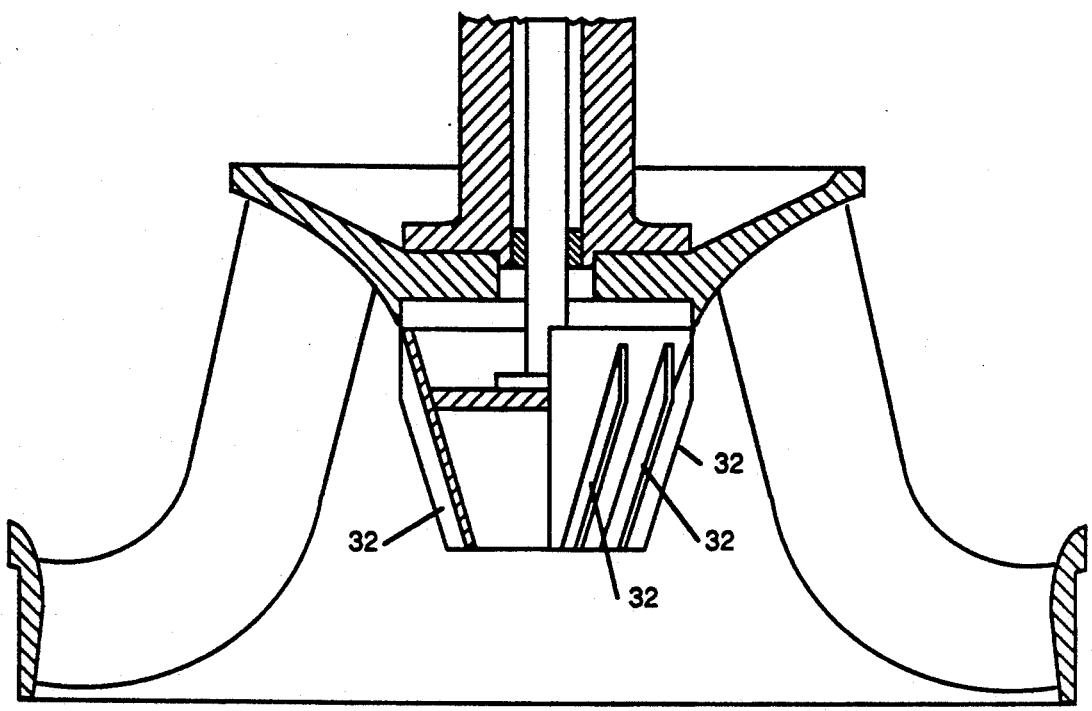
FIG. 5 shows a transition member similar to FIG. 4 in which fins are placed on the outside of the transition member.

FIG. 5 shows a modification in which fins or vanes 32 are mounted around the surface of the frustoconical cone extending axially from the apex to the base of the cone and projecting vertically outwardly.

Figure 6:
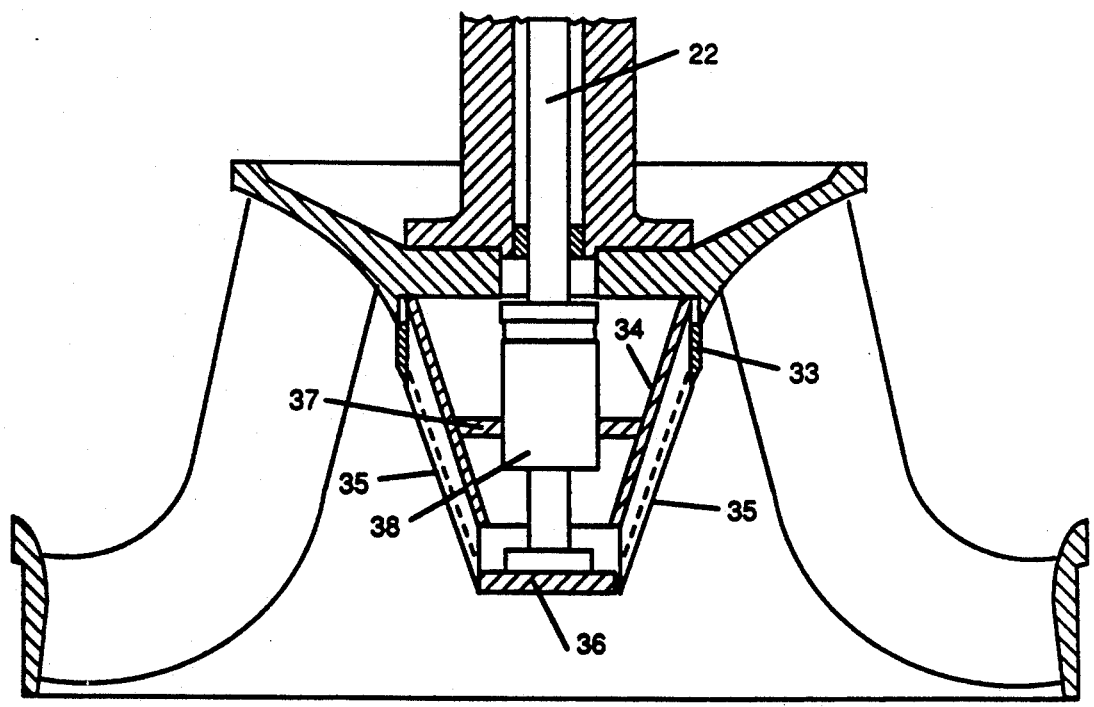
FIG. 6 shows a transition member similar to FIG. 5 having retractable fins with the fins in retracted position.
Figure 7:
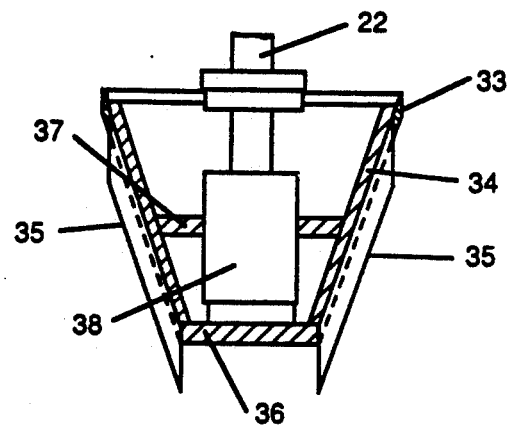
FIG. 7 shows the transition member of FIG. 6 with the fins in extended position.

FIGS. 6 and 7 show a modified type of transition member comprising an outer cone 33 and an inner cone 34. Inner cone 34 is fitted with fins 35 similar to fins 32 in FIG. 5. Outer cone 33 is provided with slots which receive fins 35. Outer cone 33 is carried on a support 36 which is on the end of shaft 22. Inner cone 34 is carried by a support 37 which is attached to a servo 38 that is axially movable on shaft 22. When inner cone 34 is in the upper position as shown in FIG. 7, fins 35 are retracted and do not project beyond the surface of outer cone 33. Thus, outer cone 33 presents an essentially smooth surface. When servo 38 is actuated to move to the lower position as shown in FIG. 8, inner cone 34 is carried downwardly to nest against the inside of outer cone 33 with fins 35 projecting as shown in FIG. 7.

Figure 8:
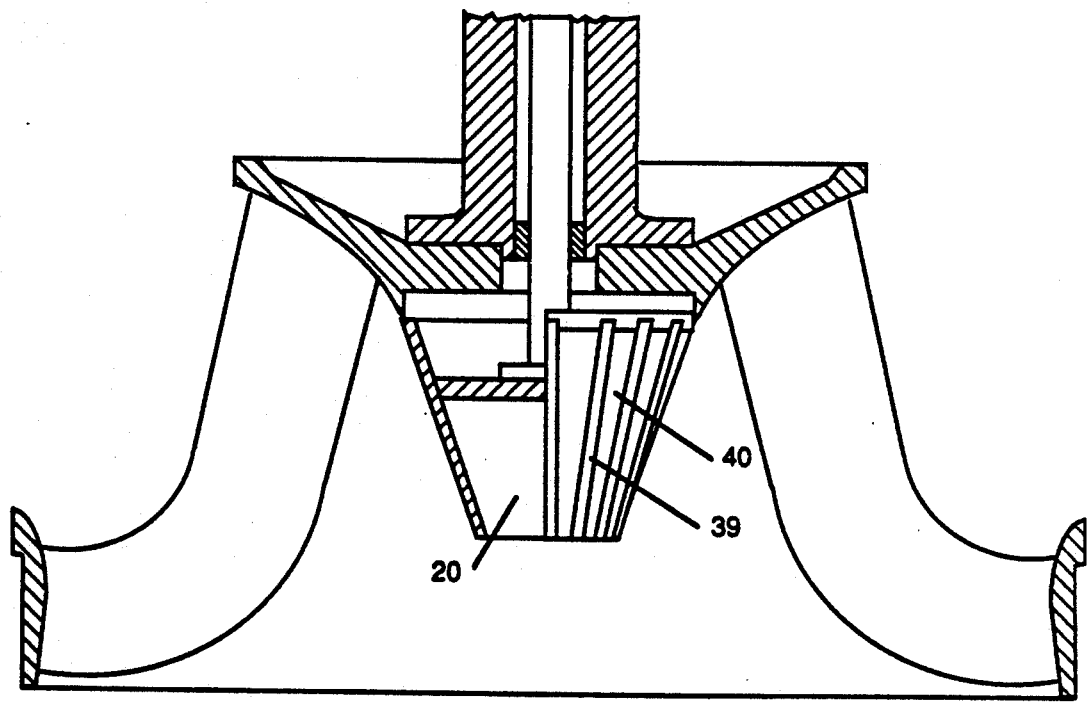
FIG. 8 is a fragmentary view similar to FIG. 3 showing a roughened surface formed on the transition member by alternating grooves and lands.

FIG. 8 shows a modified form of cone in which the outer surface has alternating lands 39 and grooves 40.

When the turbine as shown in FIG. 2 is in operation, cone 20 is in fixed position when runner 10 is rotating under load. Water which comes through blades 11 will not be given a rotational component by cone 20 since it is fixed against rotation, thereby tending to avoid generation of a vortex rope. If the surface of cone 20 is roughened by providing fins, or ridges, and grooves as shown in FIGS. 5 and 8, a greater bite will be taken on the water flowing past the transition member. The cone may be converted between a smooth surface and a roughened surface by providing retractable fins as shown in FIGS. 6 and 7.

The effect of the cone upon swirling of the water stream may be enhanced by rotating the cone independently of rotation of the runner, by drive motor 28 (FIG. 3) or drive motor 31 (FIG. 4). If the vortex rope is rotating in the same direction as the runner, cone 20 may be driven in the opposite direction to counteract the swirling motion. If the vortex rope is swirling in a direction opposite the direction of the runner, the cone may be driven in the same direction as the runner but at a higher speed. Also the effect of the transition member upon the water flow may be changed or modulated by use of retractable fins as shown in FIGS. 6 and 7.

While I have illustrated and described certain present preferred embodiments of my invention, it is to be understood that I do not limit myself thereto and that the invention may be otherwise variously practiced within the scope of the following claims.

I claim:

1. In a water turbine having a water supply conduit and a rotatable runner having a plurality of blades, the improvement which comprises a transition member positioned to channel water flow on the downstream side of the blades and rotatably mounted independent of rotation of the runner.

2. The water turbine of claim 1 in which the transition member is mounted on the runner.

3. The water turbine of claim 1 in which the transition member is rotatably driven by power means.

4. The water turbine of claim 2 in which the transition member is mounted on a shaft which is coaxial with the runner shaft.

5. A water turbine comprising a water supply conduit, a rotatable runner having a plurality of blades, shaft means connecting the runner to the rotor of a generator, second shaft means coaxial with the first shaft means, the second shaft means being mounted independent of rotation of the first shaft means and extending through the runner, and a transition member mounted on the second shaft means and positioned to channel water flow on the downstream side of the blades.

6. The water turbine of claim 5 in which the transition member is rotatably mounted independent of rotation of the runner.

7. The water turbine of claim 6 having drive means in driving connection to the transition member whereby rotational motion may be imparted to the transition member independently of rotation of the turbine runner.

8. An independently rotatable transition member for a water turbine said water turbine having a runner, said transition member in cooperative relationship to the runner of the water turbine and having a roughened surface for interaction with water flowing past the transition member.

9. The rotatable transition member of claim 8 having adjustable vanes operable to alter the extent of surface roughness.

10. The rotatable transition member of claim 9 in which the vanes are mounted on an axially movable member whereby the vanes are movable between a position in which the vanes project from the surface of the transition member and a position in which the vanes are retracted within the transition member.

* * * * *